United States Patent [19]
Dobkin et al.

[11] Patent Number: 5,929,620
[45] Date of Patent: Jul. 27, 1999

[54] SWITCHING REGULATORS HAVING A SYNCHRONIZABLE OSCILLATOR FREQUENCY WITH CONSTANT RAMP AMPLITUDE

[75] Inventors: Robert C. Dobkin, Los Gatos; Milton E. Wilcox, Saratoga, both of Calif.

[73] Assignee: Linear Technology Corporation, Milpitas, Calif.

[21] Appl. No.: 08/744,388

[22] Filed: Nov. 7, 1996

[51] Int. Cl.⁶ .................................................. G05F 1/565
[52] U.S. Cl. ............................................ 323/288; 323/285
[58] Field of Search .................................. 323/282, 284, 323/285, 288, 351

[56] References Cited

U.S. PATENT DOCUMENTS

| | | | |
|---|---|---|---|
| 3,733,540 | 5/1973 | Hawkins | 323/288 |
| 4,309,650 | 1/1982 | Boros et al. | 323/285 |
| 4,458,199 | 7/1984 | Evans et al. | 323/286 |
| 4,634,892 | 1/1987 | Isbell et al. | 323/288 |
| 4,719,552 | 1/1988 | Albach et al. | 323/282 |
| 4,837,495 | 6/1989 | Zansky | 323/285 |
| 5,335,162 | 8/1994 | Martin-Lopez et al. | 323/288 |
| 5,602,465 | 2/1997 | Clemente | 323/285 |

*Primary Examiner*—Jeffrey Sterrett
*Attorney, Agent, or Firm*—Fish & Neave; Robert W. Morris; Michael E. Shanahan

[57] ABSTRACT

Switching regulator circuits and methods are provided in which a voltage controlled oscillator circuit (VCO) is utilized to produce signals that turn ON a switch circuit. The VCO is itself controlled by a phase detector circuit that compares the output of the VCO to an external synchronization signal and locks the VCO to the external synchronization signal. The switching regulator circuits also include a slope compensation circuit that derives a slope compensation signal from an oscillator ramp signal produced by the VCO. The slope compensation signal is used to modify turning the switch circuit OFF when the duty cycle of the switch circuit exceeds a predetermined value. An alternate embodiment of the present invention includes a signal generation circuit in place of the phase detector circuit. The signal generation circuit applies a waveform to the VCO to vary the voltage oscillator circuit frequency, which causes a reduction in the amplitude of noise generated by the switching regulator circuit.

22 Claims, 4 Drawing Sheets

SWITCHING REGULATORS HAVING A SYNCHRONIZABLE OSCILLATOR FREQUENCY WITH CONSTANT RAMP AMPLITUDE

BACKGROUND OF THE INVENTION

The present invention relates to switching regulator circuits. More particularly, the present invention relates to circuits and methods for controlling the frequency of switching voltage regulators using voltage controlled oscillators.

The purpose of a voltage regulator is to provide a predetermined and substantially constant output voltage to a load from a voltage source which may be poorly-specified or fluctuating. A typical switching regulator employs a switch including a switching element (e.g., a power transistor) coupled either in series or parallel with the load. The switching regulator controls the timing of the turning ON and turning OFF of the switching element in order to regulate the flow of power to the load. Typical switching regulators employ inductive energy storage elements to convert switched current pulses into a steady load current. Thus, power in a switching regulator is transmitted across the switch in discrete current pulses (versus a linear regulator where power is transmitted across the pass element as a steady flow of current).

In order to generate a stream of current pulses, switching regulators typically include control circuitry to turn the switch ON and OFF. The switch duty cycle, which is generally defined as the percentage of time that the switch is ON relative to the total period of the oscillator, can be varied by a variety of methods. In many instances, the switching regulator needs to be synchronized to an external source. This may be accomplished by injecting an external SYNC signal into the oscillator circuit to cause the oscillator to match the SYNC signal (as is well known, the SYNC signal can only be used to speed up the oscillator circuit). In commonly used sawtooth oscillators, the voltage on a capacitor ramps up to a threshold voltage at which time the voltage resets and the cycle repeats. The effect of the SYNC signal is that the oscillator ramp signal is effectively cut short and restarted so that the oscillator produces more cycles in a given time period, but the oscillator ramp signal has a lower amplitude (because each oscillator cycle has less time to ramp up).

While pre-termination of the oscillator may not be a problem in many switching regulators, pre- termination tends to cause problems in current-mode switching regulators (i.e., switching regulators that are controlled by a current signal). One of the reasons for these problems is the fact that current-mode regulators tend to become unstable when the duty cycle exceeds 50% (i.e., when the switch is ON for more than 50% of a given oscillator period). Stability is often maintained in current-mode regulators above 50% duty cycle by injecting a slope compensation signal into the current signal. One method of producing the slope compensation signal is to "pick off" a portion of the oscillator signal to be the compensation signal. This portion, however, may be unavailable when the oscillator ramp signal is pre-terminated. Under those circumstances, the slope compensation signal is often insufficient to maintain stability in the regulator.

An additional deficiency with known switching regulators that are synchronized to a given frequency is related to the production of noise. When a regulator is held at a single frequency, such as 100 khz, noise is produced at that frequency (e.g., from the switch drivers, etc.) and at each of the harmonics of that frequency. Although the noise may be irrelevant in many circumstances, there are many other circumstances where the noise tends to affect other (i.e., non-regulator) circuit components. The noise produced at the fixed frequency tends to have a signal that is very narrow and has a relatively high amplitude (i.e., focused at the frequency of the regulator and its harmonics).

In view of the foregoing, it would be desirable to provide switching regulator circuits that include the capability to be synchronized to external signals without interfering with the slope compensation circuit.

It would also be desirable to provide switching regulator circuits and methods for synchronizing the regulators while insuring that the oscillator ramp signal reaches its predetermined peak amplitude.

It would be further desirable to provide circuits and methods for reducing effects of the noise produced in switching regulators.

SUMMARY OF THE INVENTION

It is therefore an object of the present invention to provide switching regulator circuits that include the capability to be synchronized to external signals without interfering with the slope compensation circuit.

It is also an object of the present invention to provide switching regulator circuits and methods for synchronizing the regulators while insuring that the oscillator ramp signal reaches its predetermined peak amplitude.

It is also an object of the present invention to provide circuits and methods for reducing effects of the noise produced in switching regulators.

In accordance with these and other objects of the invention, there is provided switching regulator circuits and methods that include a phase-locked loop (PLL) circuit to synchronize the oscillator circuit to external SYNC signals. The phase-locked loop circuit, which detects the external SYNC signal and locks the oscillator onto that signal, synchronizes the oscillator circuit without interfering with the production of the slope compensation signal. The synchronization is accomplished by providing a current that varies the time required to charge the timing capacitor of the oscillator circuit. For example, if the oscillator circuit needs to speed up (i.e., the SYNC signal is faster than the oscillator signal), the phase-locked loop circuit provides an increased current to the timing capacitor so that the slope of the ramp of the oscillator increases. In this manner, the period of the oscillator signal is shortened, but the oscillator signal still reaches its maximum amplitude so that the slope compensation signal is unaffected. An additional benefit from using the phase-locked loop circuit is the ease with which the VCO signal may be modulated.

In another embodiment of the present invention, the effects of noise produced by the switching regulator circuits are reduced by varying the frequency of the regulator in a controlled manner. For example, if the regulator is otherwise locked onto a frequency of 100 khz, the noise spectrum is a relatively narrow spike having a large amplitude (because all of the noise is centered around 100 khz). The switching regulators of the present invention reduce the effects of the noise by constantly varying the frequency of the regulator, for example by operating the 100 khz regulator between 75 khz and 125 khz (i.e., a 50 khz spread). The effects of varying the frequency are that the noise spectrum is spread out over a wider area having reduced amplitudes (because the noise is not permitted to build up at a single frequency). The frequency is varied in a controlled manner by applying a control signal, such as a sawtooth waveform, to a voltage controlled oscillator circuit (VCO). The control signal is used to constantly vary the time required to charge the timing capacitor of the VCO.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
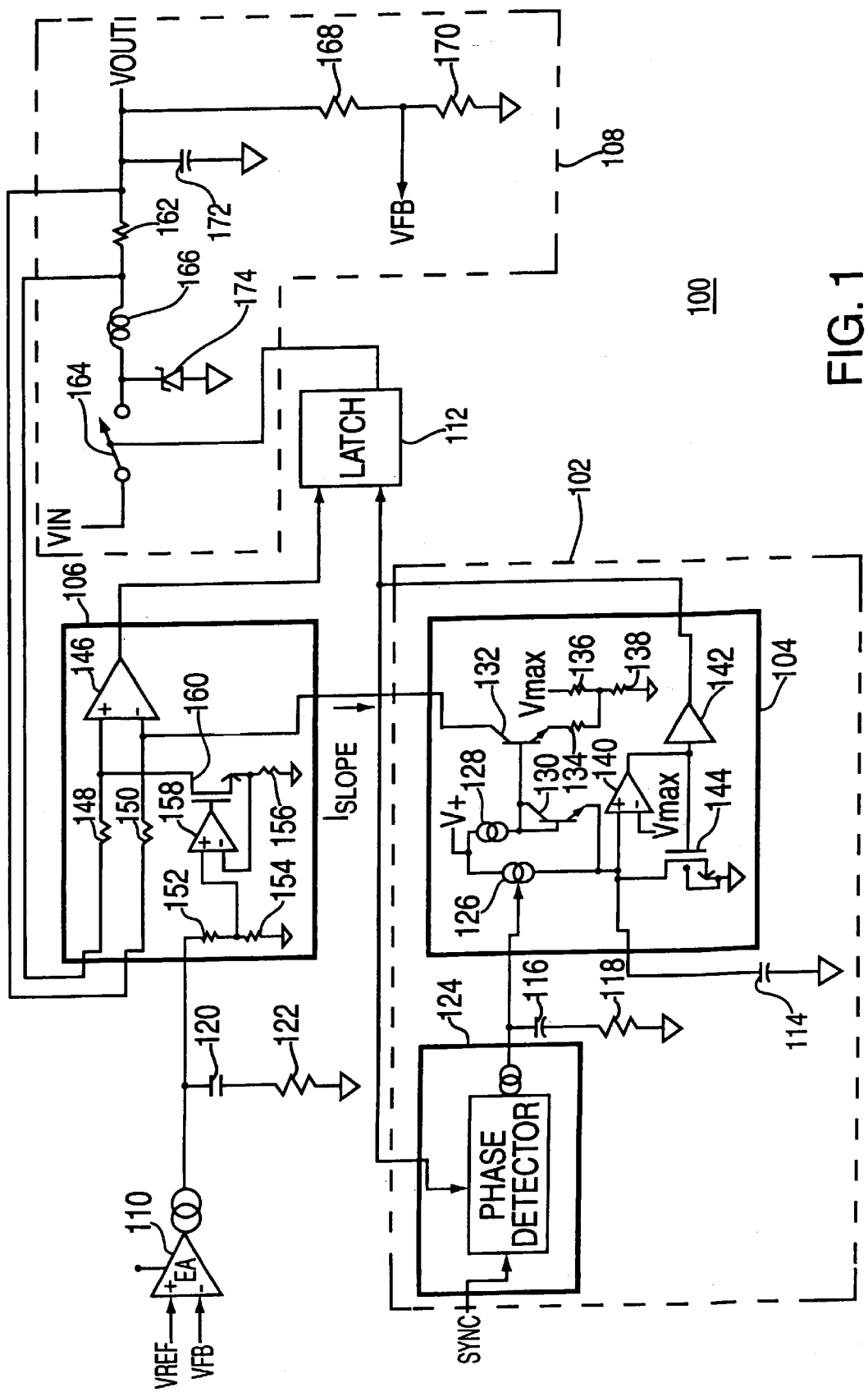
FIG. 1 is a schematic block diagram of a switching regulator circuit that includes a phase-locked loop circuit in accordance with the principles of the present invention.

FIG. 1 shows a schematic diagram of a switching regulator circuit 100 that can be synchronized to an external SYNC signal without impairing the slope compensation signal. Regulator 100 includes phase-locked loop circuit 102 (i.e., PLL 102), voltage controlled oscillator 104 (i.e., VCO 104), control circuit 106, output circuitry 108, error amplifier 110 and latch 112. Additionally, switching regulator 100 includes oscillator timing capacitor 114, PLL capacitor 116, PLL resistor 118, error amplifier capacitor 120 and error amplifier resistor 122.

PLL 102 includes phase detector 124 that compares an external input signal SYNC to the output signal of VCO 104 and produces a current that varies to change the operating frequency of VCO 104 as is described more fully below.

VCO 104 includes current sources 126 and 128, NPN transistors 130 and 132, a resistor divider formed by resistors 134, 136 and 138, comparator 140, buffer 142 and N-channel MOSFET 144. VCO 104 operates in conjunction with VCO capacitor 114 to produce a signal that varies linearly from zero to $V_{MAX}$ for each cycle of the oscillator. In the present discussion, it should be assumed that $V_{MAX}$ is about 1.2 volts so that the oscillator signal on capacitor 114 ramps up from zero to 1.2 volts (additionally, for the present example, assume that V+ is about 2.5 volts). The oscillator signal on capacitor 114 is produced from current supplied by current source 126 and by current source 128 flowing through diode-connected transistor 130. The current charges capacitor 114 until the voltage across capacitor 114 reaches $V_{MAX}$ (in this example, 1.2 volts), at which point capacitor 114 is discharged through FET 144 and the output of VCO 104 pulses HIGH (i.e., the output of buffer 142 pulses HIGH until capacitor 114 has been essentially discharged, at which point the pulse returns LOW).

The trigger for determining when to discharge capacitor 114 is controlled by comparator 140 and FET 144. Comparator 140 compares the voltage across capacitor 114 to a reference voltage that is equal to $V_{MAX}$ (i.e., the voltage on the negative input of comparator 140). Until the voltage on capacitor 114 reaches $V_{MAX}$, the signal from comparator 140 is buffered by buffer 142 so that the output signal of VCO 104 remains LOW. Once the positive input to comparator 140 reaches $V_{MAX}$, buffer 142 produces a HIGH signal, FET 144 conducts so that capacitor 114 is discharged which causes the output of buffer 142 to go LOW, and the process begins again from zero volts. The magnitude of current source 126 is controlled by the input to VCO 104 to vary the time it takes for the ramp signal to reach $V_{MAX}$. For example, if the magnitude of current source 126 is increased, the ramp signal reaches $V_{MAX}$ sooner resulting in a higher oscillator frequency.

An additional portion of VCO 104 is the circuit formed by transistor 132 and the resistor divider formed by resistors 134, 136 and 138. This circuitry produces the slope compensation signal $I_{SLOPE}$ as follows. The oscillator ramp signal that appears on the emitter of transistor 130 is translated positive by an emitter base voltage (i.e., 0.7 volts) to the collector of NPN transistor 130 and the base of NPN transistor 132, so that the signal on the base of transistor 132 varies, in the present example, from 0.7 volts to 1.9 volts. The resistor divider causes the current $I_{SLOPE}$, which is only required when the duty cycle exceeds 50% (because the regulator is stable below 50% duty cycle), to remain at zero until the duty cycle begins to increase above the predetermined value set by resistors 136 and 138, at which time $I_{SLOPE}$ begins to ramp up to a maximum value set by $V_{MAX}$ (which, in the present example, is 1.2 volts). The duty cycle at which $I_{SLOPE}$ begins to ramp up is typically set at somewhat less than 50% to provide a safety margin. In this manner, the slope compensation signal reaches its maximum value at the same time that the oscillator signal reaches its maximum value, before both signals are reset for the next cycle.

Control circuit 106 includes comparator 146, resistors 148–156, unity gain follower 158 and N-channel FET 160. Comparator 146, which is the current sense comparator, looks at the inductor current of switching regulator 100 (which is measured across resistor 162 in output circuit 108) to determine when to turn the switch 164 OFF. $I_{SLOPE}$ is applied to regulator 100 via the connection between the collector of transistor 132 and the negative input of comparator 146 so that $I_{SLOPE}$ causes a voltage drop to occur across resistor 150. The inductor current at which comparator 146 trips is based on the $I_{THRESHOLD}$ voltage that is input from error amplifier 110, as described below, into the voltage divider formed by resistor 152 and 154, and the relationship between resistors 148 and 156 (which establishes a voltage drop across resistor 148). In the present example, assume that resistors 152 and 154 have values of 180 KΩ and 30 KΩ, respectively, so that unity gain follower 158 is set to ⅐ of the $I_{THRESHOLD}$ voltage, and further assume that resistors 148 and 150 are 4 KΩ resistors and that resistor 156 is 8 KΩ.

Based on the resistor values presented, a current is forced through resistor 148 (at the positive input to comparator 146) that produces a voltage drop across resistor 148 equal to 1/14 of the $I_{THRESHOLD}$ voltage. Assuming that the forced voltage drop across resistor 148 is 100 mV, then comparator 146 triggers (by going from LOW to HIGH) to turn off switch 164 when the current through the resistor 162 (of output circuit 108) is greater than a 100 mV drop. Additionally, the slope compensation current $I_{SLOPE}$, which is only generated at duty cycles above 50%, causes a voltage drop to occur across resistor 150 that adjusts when comparator 146 turns off switch 164 (as $I_{SLOPE}$ increases, decreasing current through resistor 162 is required to turn off switch 164).

Error amplifier 110 generates $I_{THRESHOLD}$ based on the error between a reference voltage VREF and the feedback signal VFB that is measured by the voltage divider formed from resistors 168 and 170 in output circuit 108. The output of error amplifier 110 charges capacitor 120 in the filter formed by capacitor 120 and resistor 122.

The regulated output signal VOUT is the voltage seen across capacitor 172, which is charged by the current flowing through resistor 162. The input signal VIN is applied to switch 164, which is closed by a signal from latch 112 (which may be, for example an R-S latch in which the R input comes from control circuit 106 and the S input comes from VCO 104). Switch 164 may be any switch conventionally used with switching regulators, such as a power transistor. If a power transistor is utilized for switch 164, switch 164 will also include the appropriate driver circuitry needed to drive the power transistor. When a single switch is used, such as switch 164, schottky diode 174 is placed between inductor 166 and ground to provide a negative path for inductor 166. An alternate embodiment of switch 164 might include utilizing a second switch (not shown) in place of schottky diode 174.

Figure 2:
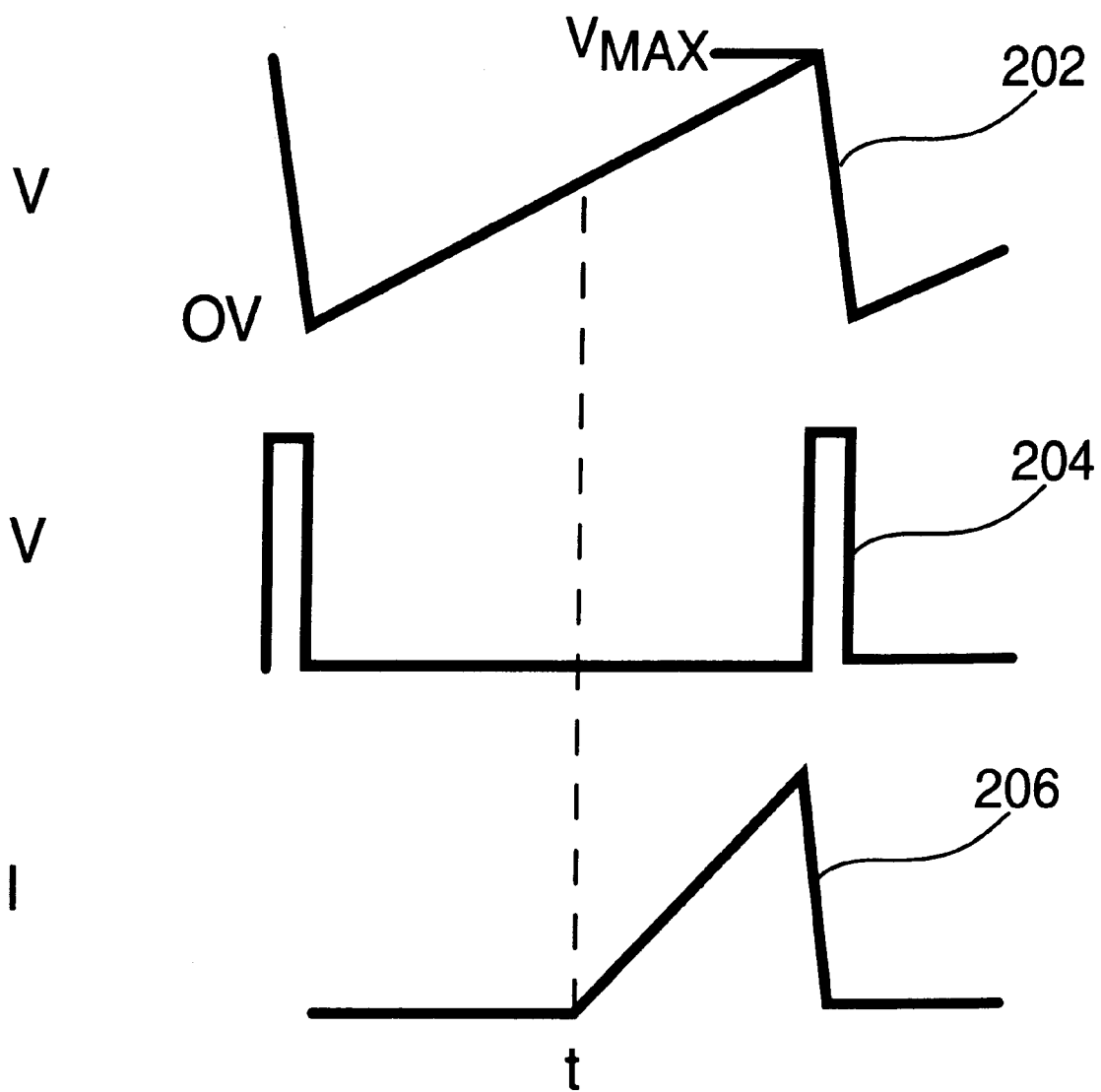
FIG. 2 is a general illustration of various waveforms produced by the switching regulator circuit of FIG. 1 in accordance with the principles of the present invention.

FIG. 2 shows three illustrative waveforms, all having the same scale with respect to time t, of signals produced by switching regulator 100 of FIG. 1. Waveform 202 illustrates the waveform produced across capacitor 114 as capacitor 114 is charged and discharged between zero volts and $V_{MAX}$ (i.e., the voltage on the positive input of comparator 140). Waveform 204 illustrates a typical signal produced by the output of VCO 104 (via the output of buffer 142) that is a signal that momentarily pulses from LOW to HIGH whenever capacitor 114 if "fully" charged (fully charged being when capacitor 114 is charged to a voltage equal to $V_{MAX}$, or whatever the reference voltage is that is applied to the negative input of comparator 140). Waveform 206 illustrates a sample $I_{SLOPE}$ current signal that is produced in the collector of transistor 132 to establish a voltage drop across resistor 150. It should be noted that signal $I_{SLOPE}$ remains at zero amperes until approximately half of the oscillator cycle has passed (see waveform 202).

Figure 3:
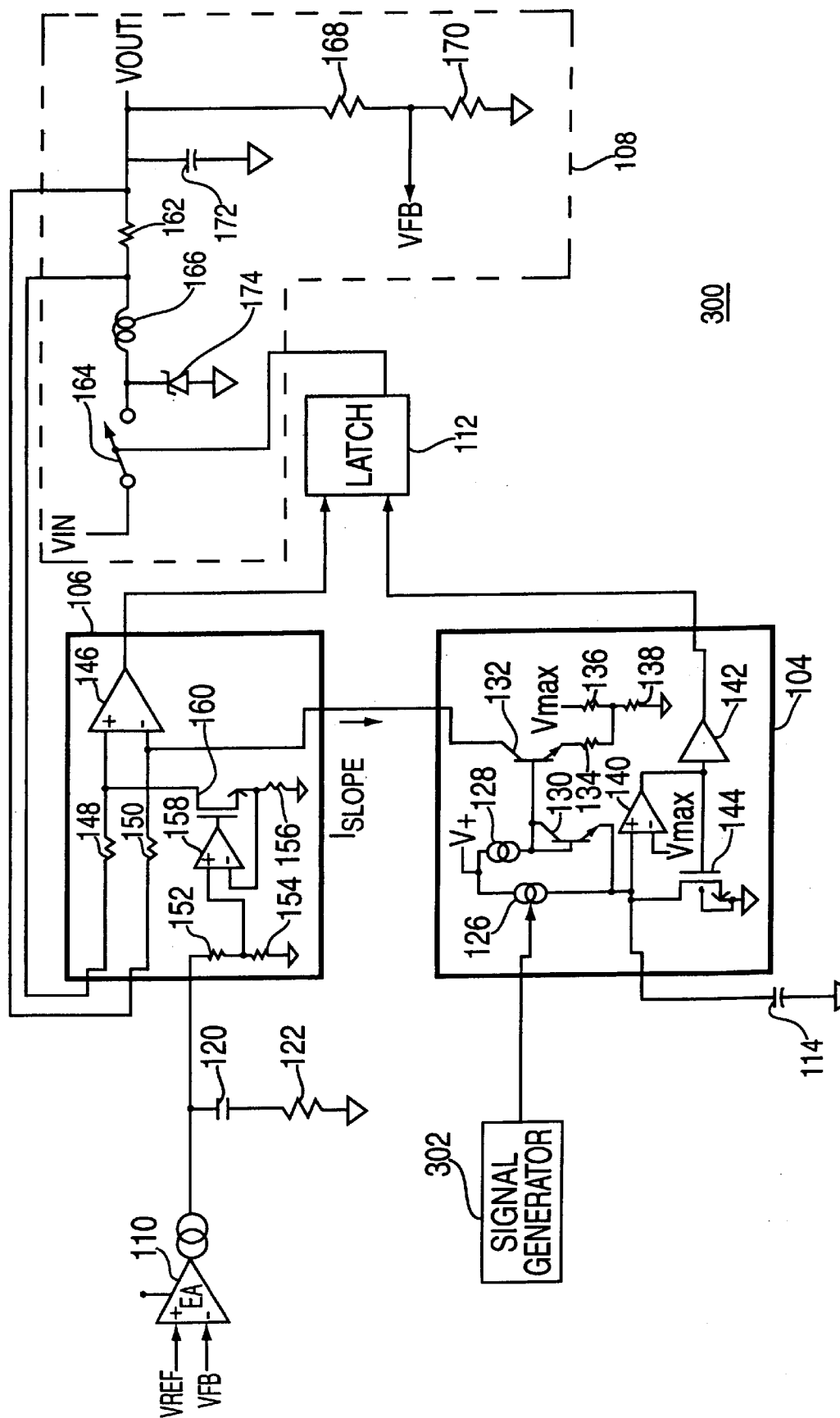
FIG. 3 is a schematic block diagram of an alternate embodiment of a switching regulator circuit in accordance with the principles of the present invention in which a voltage controlled oscillator is used to reduce the effects of noise produced by the switching regulator.

An alternate embodiment of the present invention is shown in FIG. 3 in which switching regulator 300 may be operated to reduce the effects of noise generated by regulator 300. Regulator 300 is similar to regulator 100 of FIG. 1 in many ways. Accordingly, substantially similar components are numbered in regulator 300 with the same reference numerals as regulator 100, and the above description applies to those components.

Regulator 300 reduces the effects of noise by replacing phase detector 124, capacitor 116 and resistor 118 with a signal generator 302. Signal generator 302 produces a signal that forces the VCO frequency to vary in a controlled manner. For example, if a sawtooth signal is produced by signal generator 302, the sawtooth signal is applied to current source 126 which causes capacitor 114 to charge either more rapidly, or more slowly (depending on which point in the sawtooth waveform the input is) so that the frequency of VCO 104 varies by a predetermined amount about a central frequency. The variation in charging time of capacitor 114 varies the frequency of the oscillator signal, without requiring pre-termination of the oscillator signal. Therefore, slope compensation and the use of the signal $I_{SLOPE}$ is not interfered with and regulator 300 remains stable, even at duty cycles above 50%.

Figure 4:
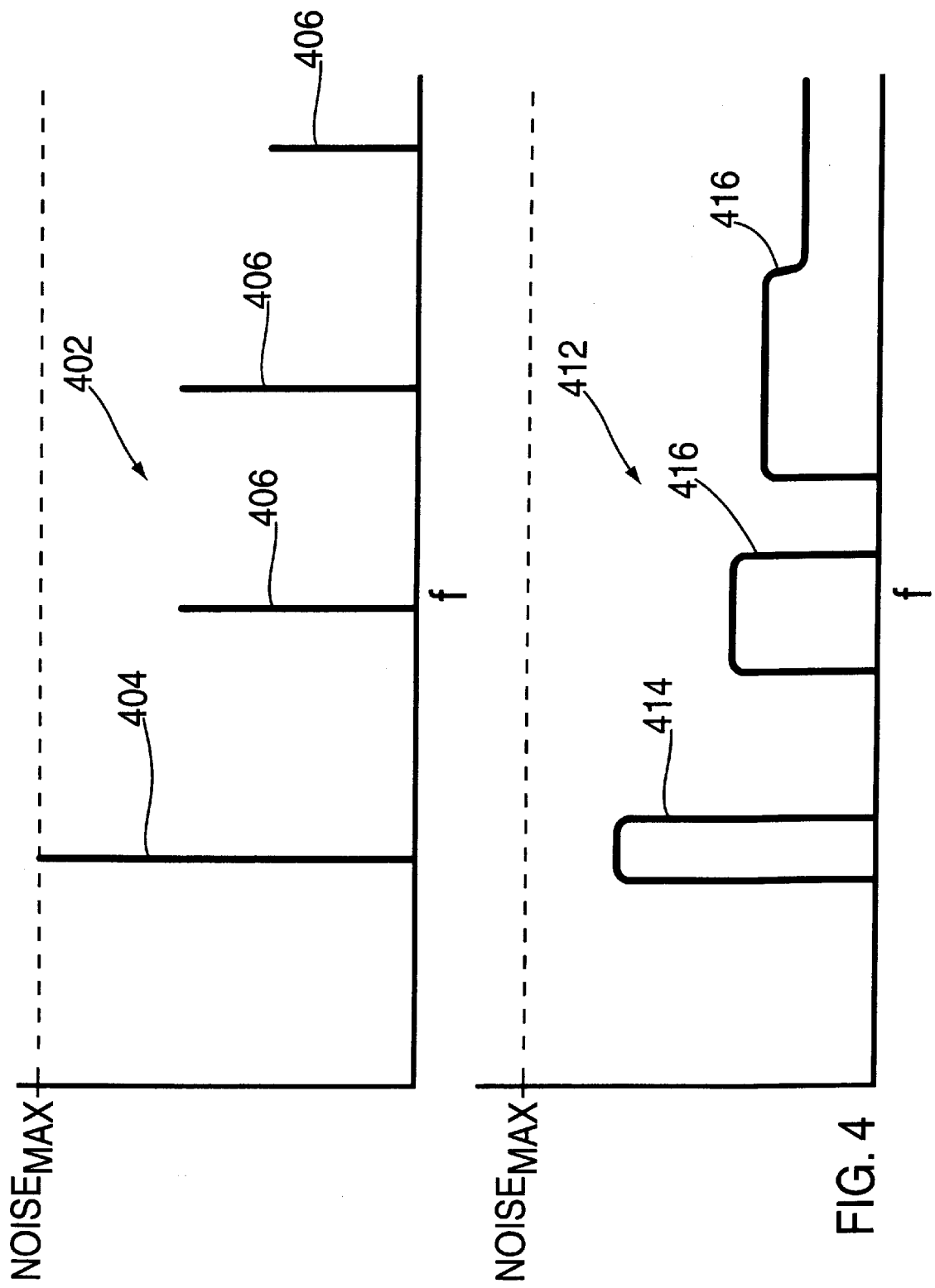
FIG. 4 is a general illustration of two noise waveforms produced by the switching regulator circuit of FIG. 3 in accordance with the principles of the present invention.

The change in frequency, however, produces very beneficial results, as is shown in FIG. 4. FIG. 4 shows two illustrations of a frequency spectrum that may be produced by regulator 300 of FIG. 3. Waveform 402 represents the noise spectrum produced by regulator 300 when signal generator 302 produces a constant signal that causes the oscillator signal to remain at a constant frequency f. The amplitude of the noise at frequency f, which is indicated by the peak of trace 404, reaches $NOISE_{MAX}$. Similarly, traces 406 refer to the noise signals produced at the harmonics of frequency f.

Waveform 412, on the other hand, represents the operation of regulator 300 in accordance with the principles of the present invention to reduce the effects of the noise produced by the regulator. Waveform 412 includes trace 414 (which, in reality, would appear as a series of spikes having peaks that approximate the curve shown in FIG. 4, rather than the curve shown) is shown having a wider range of frequency than trace 404, in exchange for a lower amplitude. Similarly, harmonic traces 416 are likewise wider and shorter than harmonic traces 406. Waveform 412 is the noise waveform that results when regulator 300 is provided with a signal from signal generator 302 that varies, such as the sawtooth waveform described above. Constant varying of the operational frequency of the oscillator, even over a small range, results in a reduction in the cumulative effects (with respect to amplitude) of the noise produced by the regulator.

While the principles of the present invention have been illustrated using buck, step-down switching regulators, persons skilled in the art will appreciate that the principles may be equally applied to other switching regulator topologies, including for example, boost, step-up switching regulators and buck-boost switching regulators. Thus, persons skilled in the art will appreciate that the principles of the present invention can be practiced by other than the described embodiments, which are presented for purposes of illustration and not of limitation, and the present invention is limited only by the claims which follow.

What is claimed is:

1. A switching regulator circuit that provides a regulated voltage at an output terminal to a load, said switching regulator circuit comprising:

a switch circuit coupled to an input terminal and to said output terminal;

an output circuit coupled to said output terminal, said output circuit providing a feedback signal that is representative of said regulated voltage;

a control circuit coupled to said output circuit and to said switch circuit, said control circuit providing a control signal to said switch circuit so that said switch circuit interrupts current flow from said input terminal to said output circuit, said control signal being produced, at least in part, from said feedback signal;

a voltage controlled oscillator circuit that provides an oscillator output signal to said switch circuit to control the frequency at which current is supplied to said output circuit from said input terminal, said voltage controlled oscillator circuit producing a ramp signal that varies from a minimum to a maximum value; and a signal control circuit coupled to said voltage controlled oscillator circuit, said signal control circuit controlling the frequency at which said voltage controlled oscillator circuit operates so that said minimum and maximum values of said ramps signal are substantially constant.

2. The switching regulator circuit of claim 1, wherein said signal control circuit includes a phase detector that compares a synchronization signal to said oscillator output signal, said phase detector providing a signal to said voltage controlled oscillator to change the frequency of said oscillator output signal to match the frequency of said synchronization signal; said voltage controlled oscillator circuit and said signal control circuit comprising a phase-locked loop circuit.

3. The switching regulator circuit of claim 1, further comprising a slope compensation circuit that produces a slope compensation signal when the duty cycle of said switching regulator exceeds a predetermined value, said slope compensation circuit being coupled to said control circuit.

4. The switching regulator circuit of claim 3, wherein said slope compensation circuit provides a slope compensation signal that varies in response to said ramp signal.

5. The switching regulator circuit of claim 4, wherein said slope compensation circuit provides said slope compensation signal such that said slope compensation signal reaches a maximum value at approximately the same time that said ramp signal reaches said maximum value.

6. The switching regulator circuit of claim 1, wherein said signal control circuit comprises a signal generator that controls said voltage controlled oscillator circuit so that said voltage controlled oscillator circuit varies in frequency in a manner that reduces the effects of noise produced by said regulator circuit.

7. The switching regulator circuit of claim 6, wherein said signal generator generates a sawtooth waveform that causes the frequency of said voltage controlled oscillator circuit to vary a predetermined amount.

8. The switching regulator circuit of claim 6, further comprising a slope compensation circuit that produces a slope compensation signal when the duty cycle of said switching regulator exceeds a predetermined value, said slope compensation circuit being coupled to said control circuit.

9. The switching regulator circuit of claim 8, wherein said slope compensation circuit provides a slope compensation signal that varies in response to said ramp signal.

10. The switching regulator circuit of claim 9, wherein said slope compensation circuit provides said slope compensation signal such that said slope compensation signal reaches a maximum value at approximately the same time that said ramp signal reaches said maximum value.

11. A switching regulator circuit that provides a regulated voltage to a load, said regulator circuit comprising:

an output circuit including a switch coupled to an input terminal and an output terminal, said output circuit providing a signal that is indicative of said regulated voltage;

a control circuit coupled to said output circuit, said control circuit providing a control signal to said switch circuit so that said switch circuit interrupts the flow of current from said input terminal to said output circuit;

a voltage controlled oscillator circuit coupled to said control circuit to provide a switch signal that controls the frequency at which current is supplied to said output circuit from said input terminal; and a phase detector circuit coupled to receive a synchronization signal, said phase detector circuit being coupled to said voltage controlled oscillator to compare the frequency of said switch signal to the frequency of said synchronization signal, said phase detector circuit providing a correction signal to said voltage controlled oscillator to match the frequency of said switch signal to the frequency of said synchronization signal.

12. The switching regulator circuit of claim 11, further comprising a slope compensation circuit that produces a slope compensation signal when the duty cycle of said switching regulator exceeds a predetermined value, said slope compensation circuit being coupled to said control circuit so that said control signal interrupts the flow of current from said input terminal to said output circuit, at least in part, in response to said slope compensation signal.

13. The switching regulator circuit of claim 12, wherein said voltage controlled oscillator produces an oscillator ramp signal, said slope compensation circuit being coupled to receive said ramp signal, said slope compensation signal being derived from said ramp signal.

14. A switching regulator circuit that provides a regulated voltage to a load at reduced noise levels, said regulator circuit comprising:

an output circuit including a switch coupled to an input terminal and an output terminal, said output circuit providing a signal that is indicative of said regulated voltage;

a control circuit coupled to said output circuit, said control circuit providing a control signal to said output circuit that interrupts to flow of current from said input terminal to said output circuit;

a voltage controlled oscillator circuit coupled to said control circuit to provide a switch signal that controls the frequency at which current is provided to said output circuit from said input terminal; and a signal generation circuit coupled to said voltage controlled oscillator circuit to control the frequency of said voltage controlled oscillator circuit in a manner that reduces the effects of noise produced by said regulator circuit.

15. The switching regulator circuit of claim 14, wherein said signal generation circuit controls the frequency of said voltage controlled oscillator circuit by applying a sawtooth waveform.

16. A method for providing a regulated voltage to a load, said method comprising the steps of:

producing an oscillator ramp signal that varies between a minimum value and a maximum value;

converting said ramp signal to an oscillator pulse signal;

coupling a synchronization signal to a phase detector circuit;

comparing the frequency of said pulse signal to the frequency of said synchronization signal with said phase detector circuit, said phase detector circuit causing the frequency of said ramp signal to vary if said comparison shows that the frequency of said pulse signal and the frequency of said synchronization signals are not equal, the frequency of said ramp signal being varied to lock the frequency of said pulse signal to the frequency of said synchronization signal;

applying said pulse signal to a switch in a switching regulator output circuit to control the frequency at which current pulses are provided to said output circuit, said current pulses causing an output signal to be produced;

monitoring a signal that is indicative of said output signal; and interrupting current flow when said monitoring step determines that said signal indicative of said output signal reaches a predetermined threshold value.

17. The method of claim 16, further comprising the steps of:

deriving a slope compensation signal from said ramp signal when the duty cycle of said switch is greater than a predetermined value; and using said slope compensation signal to modify said step of turning said switch OFF.

18. The method of claim 17, wherein said step of deriving produces said slope compensation signal such that said slope compensation signal varies in response to said ramp signal.

19. The method of claim 18, wherein said ramp signal and said slope compensation signal each reach a maximum value at substantially the same time.

20. A method for reducing the level of noise produced by a switching regulator that generates a regulated voltage for a load, said method comprising the steps of:

producing an oscillator ramp signal as a result of a current charging a capacitor, said ramp signal varying between a minimum value and a maximum value;

converting said ramp signal to an oscillator pulse signal;

applying a signal to said current that varies the magnitude of said current;

applying said pulse signal to a switch in a switching regulator output circuit to control the frequency at which current pulses are provided to said output circuit, said current pulses causing an output signal to be produced;

monitoring a signal that is indicative of said output signal; and interrupting current flow to said output circuit when said monitoring step determines that said signal indicative of said output signal reaches a predetermined threshold value.

21. The method of claim 20, further comprising the steps of:

deriving a slope compensation signal from said ramp signal when the duty cycle of said switch is greater than a predetermined value; and using said slope compensation signal to modify said step of interrupting current flow.

22. The method of claim 21, wherein said ramp signal and said slope compensation signal each reach a maximum value at substantially the same time.

* * * * *